US008960161B2

(12) United States Patent
Bartsch et al.

(10) Patent No.: US 8,960,161 B2

(45) Date of Patent: Feb. 24, 2015

(54) FUEL INJECTION SYSTEM

(75) Inventors: Leonhard Bartsch, Aachen (DE); Dietmar Hermann, Roetgen (DE); Claus Maerschank, Wuerselen (DE); David van Bebber, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 755 days.

(21) Appl. No.: 13/087,606

(22) Filed: Apr. 15, 2011

(65) Prior Publication Data

US 2011/0253106 A1 Oct. 20, 2011

(30) Foreign Application Priority Data

Apr. 15, 2010 (DE) ......................... 10 2010 027 789

(51) Int. Cl.
*F02M 37/00* (2006.01)
*G06F 19/00* (2011.01)

(52) U.S. Cl.
CPC ....... *F02M 37/0029* (2013.01); *F02M 2200/40* (2013.01)
USPC .......................................... 123/514; 701/112

(58) Field of Classification Search
USPC .................. 123/447, 456, 514, 179.4, 179.3; 701/112, 113
See application file for complete search history.

(56) References Cited

U.S. PATENT DOCUMENTS

| | | | | | |
|---|---|---|---|---|---|
| 4,651,779 | A * | 3/1987 | Filippi et al. | ............... | 137/493.3 |
| 5,056,492 | A * | 10/1991 | Banse | ........................... | 123/509 |
| 5,143,115 | A * | 9/1992 | Geyler, Jr. | ..................... | 137/493 |
| 5,398,655 | A * | 3/1995 | Tuckey | ......................... | 123/456 |
| 5,477,829 | A * | 12/1995 | Hassinger et al. | ............ | 123/467 |
| 5,626,121 | A * | 5/1997 | Kushida et al. | ............... | 123/514 |
| 5,749,345 | A * | 5/1998 | Treml | ........................... | 123/456 |
| 5,901,742 | A * | 5/1999 | Kleppner et al. | ............. | 137/508 |
| 6,352,067 | B1 * | 3/2002 | Genslak | ........................ | 123/510 |
| 6,474,294 | B2 * | 11/2002 | Yamazaki et al. | ............ | 123/295 |
| 7,004,146 | B1 | 2/2006 | Kato | | |
| 7,086,388 | B2 * | 8/2006 | Roth et al. | .................... | 123/510 |
| 7,086,413 | B2 * | 8/2006 | Yu et al. | ..................... | 137/493.9 |
| 7,124,740 | B2 * | 10/2006 | Nomura et al. | ............... | 123/458 |
| 2004/0250795 | A1 * | 12/2004 | Stroia et al. | ................... | 123/447 |
| 2006/0231078 | A1 * | 10/2006 | Barylski et al. | ............... | 123/511 |

FOREIGN PATENT DOCUMENTS

| | | | |
|---|---|---|---|
| DE | 3044254 | A1 | 6/1982 |
| DE | 19547877 | A1 | 6/1997 |
| DE | 10223077 | A1 | 12/2003 |
| DE | 102004027246 | A1 | 1/2005 |
| DE | 102004017729 | A1 | 10/2005 |
| DE | 60114702 | T2 | 7/2006 |
| EP | 1262658 | A2 | 12/2002 |
| WO | 03067072 | A1 | 8/2003 |

* cited by examiner

*Primary Examiner* — Hieu T Vo
*Assistant Examiner* — Sherman Manley
(74) *Attorney, Agent, or Firm* — Julia Voutyras; Alleman Hall McCoy Russell & Tuttle LLP

(57) ABSTRACT

The present application relates to a fuel injection system of an internal combustion engine having an automatic stop-start system, the fuel injection system comprising a high pressure fuel pump, which via a fuel pump line delivers fuel towards a common fuel rail, to which a fuel return line is connected. It is proposed that the fuel return line comprise a control element system, which firstly discharges a fuel pressure to a fuel tank, when a first predefined pressure limit is reached in the fuel return line, and which secondly prevents a further flow of fuel from the return line into the fuel tank, but allows a flow of fuel from the fuel tank into the fuel return line, so that the return line is designed as a fuel pressure accumulator.

17 Claims, 3 Drawing Sheets

FUEL INJECTION SYSTEM

RELATED APPLICATIONS

This application claims priority to German Patent Application No. 102010027789.4, filed on Apr. 15, 2010, the entire contents of which being incorporated herein by reference.

BACKGROUND

The disclosure relates to a fuel injection system for an internal combustion engine having an automatic stop-start system, comprising at least one fuel pump, which via at a fuel pump line delivers fuel towards a common fuel rail, to which a fuel return line is connected.

DE 195 47 877 A1 discloses a high-pressure fuel accumulator system for a fuel injection system used in internal combustion engines, in which system fuel is delivered via a high-pressure pump into at least one central main fuel accumulator, from whence it is fed to electrically controlled injection valves. In the event of operating load variations it must be possible to produce considerable pressure changes in the high-pressure accumulator within just a few engine revolutions, DE 195 47 877 A1, for example, explaining that additional fuel could be delivered into the high-pressure fuel accumulator by means of the high-pressure pump. The high-pressure pump would then have to deliver virtually twice the quantity of fuel, and would also have to be designed for this, so that for the greater part of the overall operating time the high-pressure pump would be over-dimensioned. In order to relieve the high-pressure pump, particularly in respect of the load variations, and in order to be able to use a high-pressure pump of smaller design, DE 195 47 877 A1 therefore proposes that an auxiliary fuel accumulator be hydraulically connected to the main fuel accumulator, a remotely operated, electrically controlled valve being arranged in the hydraulic connection between the fuel accumulators. Thus in the event of operating load variations of the internal combustion engine, fuel could be delivered to the main fuel accumulator from the auxiliary fuel accumulator, without the high-pressure pump having to deliver more fuel.

DE 102 23 077 A1 discloses a fuel injection system for internal combustion engines with direct fuel injection. The system comprises a pre-supply pump and a high-pressure pump. The pre-supply pump delivers fuel to the high-pressure pump, which at least indirectly supplies one or more injectors with fuel. A pressure accumulator is provided between the pre-supply pump and the high-pressure pump, the pre-supply pump being cyclically operated as a function of the pressure prevailing in the pressure accumulator. In other words, the pre-supply pump is switched off when a defined pressure prevails in the pressure accumulator.

DE 10 2004 017 729 A1 discloses a fuel injection system for internal combustion engines, comprising a low-pressure area and a high-pressure area. On the low-pressure side the quantity of fuel is controllably matched to the quantity demand by the internal combustion engine by delivering fuel in the low-pressure area from the fuel tank by means of a fuel pump and feeding it via a feed circuit to the suction side of a high-pressure pump. Excess fuel flows back to the fuel tank via a return line. A non-return valve, the function of which will not be described in more detail, is arranged in the return line. A restrictor connection is arranged between the return line and the feed line.

DE 30 44 254 A1 discloses a fuel injection device having a high-pressure accumulator. Pressure relief lines of all injection valves open into a common low-pressure accumulator from which a return line branches off, and in which a fuel pressure level can be set and kept at a specific ratio to that of the high-pressure accumulator. A buffer accumulator chamber is assigned to the fuel path at some point downstream of a pilot valve. The buffer accumulator chamber forms an auxiliary volume, on which a limited elasticity is imposed, and may itself be of pliable design and defined by a hollow body with elastically deformable walls.

Modern internal combustion engines are often designed with so-called automatic stop-start systems so as to shut-off the internal combustion engine in the event of a brief stoppage of the motor vehicle, in order thereby to save fuel when the vehicle is stationary. Suitable mechanisms are used to restart the internal combustion engine when an automatic start is requested. Such automatic stop-start systems afford distinct savings in the fuel consumption of an automobile, for example, and other motor vehicles.

In order to be able to equip common rail diesel engines, for example, with an automatic stop-start system, it is necessary within a short space of time to provide sufficient pressure in the common rail to be able perform the first fuel injection. Since the pressure in the high-pressure system drops due to leakage after stopping the internal combustion engine, the necessary pressure must be built up again during the starting sequence. Starting the engine following a complete or partial stoppage of the engine must then be feasible as rapidly as possible in order to avoid unwanted delays, for example in critical road situations, or to ensure a comfortable driving performance.

For starting a diesel engine having a common rail system, for example, it is necessary to provide a minimum pressure in the rail system. This minimum pressure amounts to 100-150 bar, for example, and varies according to the system used. The rail pressure is therefore one of the factors that influence the rapidity with which the internal combustion engine can be started.

The pressure in the high-pressure area of the common rail system typically falls rapidly after stoppage and while the engine is being shut down. Here the drop in pressure is mainly caused by leakage points on the injectors, the pump or even any valves fitted.

Various assembly configurations are feasible for fuel injections systems. For example, possible variations include the number of fuel injectors, the number of common rails, additional divided rails, and additional valves, for example, for pressure control.

To restart the engine, the pressure in the rail system must be rapidly raised again to a level at which starting is possible. In currently known systems, the pressure can be increased only by the high-pressure pump already used, which typically is driven via the engine. For various reasons such as cost-saving and energy efficiency, for example, the smallest possible pumps are used. This relates firstly to the overall physical size but also to the volumetric flow that is generated per revolution.

The build-up of pressure by the high-pressure pump crucially depends on the volumetric efficiency of the piston chamber of the high-pressure pump, the air content of the liquid (diesel) and the starting pressure for engine and pump starting.

SUMMARY

Accordingly, the above issues can be at least be partially addressed by a fuel injection system for an internal combustion engine, comprising a fuel pump, a common fuel rail, a fuel pump line coupled to the fuel pump and the common fuel rail and configured to deliver fuel towards the common fuel rail, and a fuel return line coupled to the common fuel rail and a fuel tank. The fuel return line comprises a control element system to discharge fuel pressure to the fuel tank when a pressure value in the fuel return line is above a predetermined threshold and to prevent fuel flow into the fuel tank when the pressure value in the fuel return line is not above the predetermined threshold, and further configured to allow fuel from the fuel tank to flow into the fuel return line.

In this manner, the pressure in the rail system can readily be raised to a sufficiently high starting pressure very rapidly after a stoppage of the internal combustion engine.

Fuel pressure accumulation is thereby achieved by the fuel return line, which comprises a control element system, and which firstly discharges a fuel pressure to a fuel tank, when a calibrated pressure limit is reached in the fuel return line, and which secondly prevents a further pressure fall in the return line due to fuel flowing from the return line into the fuel tank, so that the return line is designed as fuel pressure accumulator. The control element system is advantageously still designed so as to allow a flow of fuel from the tank towards and into the fuel return line.

The further advantage achieved by the disclosure is that no additional components are necessary for an additional fuel accumulator. This is a considerable advantage in view of the limited overall space available in the engine compartment, since the return line, in addition to its own function of returning excess fuel in the normal operation of the internal combustion engine, itself also assumes the (dual) function as expandable fuel pressure accumulator, for example when the internal combustion engine is stopped at traffic lights, say, or at a grade crossing, for example.

Further advantageous developments are disclosed in the claims and in the following description of the figures, which show

DETAILED DESCRIPTION

Figure 1:
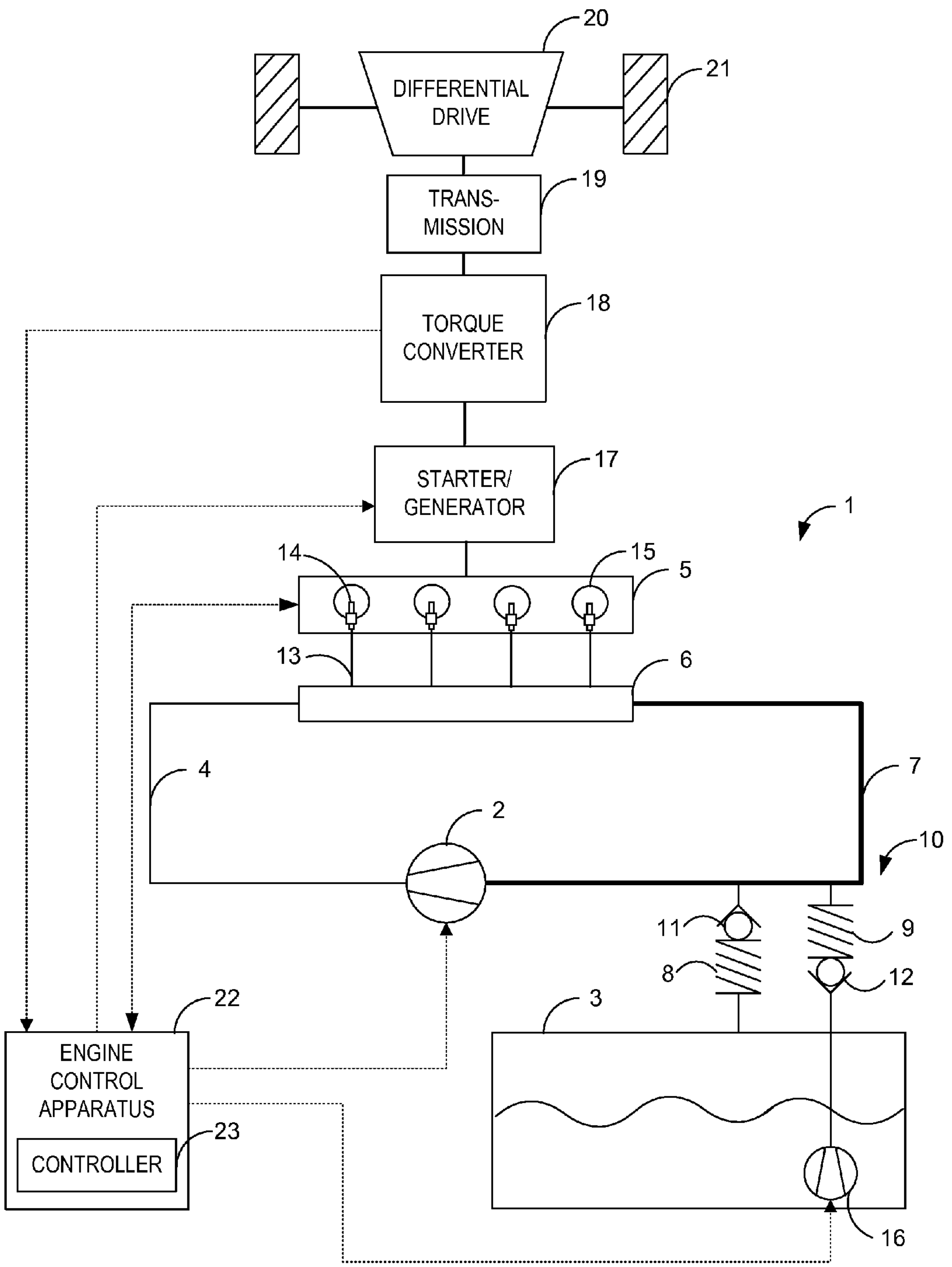
FIG. 1 schematically shows an example vehicle system including a fuel injection system according to one embodiment of the present disclosure.

FIG. 1 shows a schematic representation of an example vehicle system 100 including a fuel injection system 1 for an internal combustion engine 5, the system comprising a first fuel pump 2, which draws fuel from a fuel tank 3 and delivers it via at least one fuel pump line 4 towards at least one common fuel rail 6. Injector lines 13 feed the pumped fuel to fuel injectors 14 for supplying fuel for combustion in cylinders 15 of the internal combustion engine 5.

From the common fuel rail 6 a fuel return line 7 is in fluid communication with the fuel tank 3 to return excess fuel to the tank. The return line 7 is coupled to the suction side of the first fuel pump 2, which in the exemplary embodiment shown is embodied as a high-pressure pump 2.

The fuel return line 7 comprises a control element system 10, which as shown by way of example comprises a plurality of parallel valves 8 and 9. In this example embodiment, the valves 8, 9 comprise two parallel check valves, which are configured to restrict flow in opposite directions. The first check valve 8 is arranged downstream of the second check valve 9 but upstream of the point where the fuel return line 7 is coupled to the fuel pump 2. Both check valves 8, 9 are connected to the fuel tank 3.

The first check valve 8 is designed so that fuel pressure from the return line can be discharged to the fuel tank 3, and thus a fuel flow can occur to the fuel tank 3, when a calibrated fuel pressure limit is reached or exceeded in the fuel return line 7. The second check valve 9 is designed so that no fuel can flow out of the fuel return line 7 into the fuel tank 3 and the fuel pressure in the fuel return line 7 is thereby maintained, when the internal combustion engine 5 stops. The second check valve 9 is designed so that fuel can flow from the fuel tank 3 towards and into the fuel return line 7 via a second, low pressure fuel pump 16 located within the fuel tank 3.

The first check valve 8 is suitably arranged in the fuel return line 7 downstream of the second check valve 9 in the direction of flow of the fuel. As is shown by way of example, the two check valves 8, 9 are fitted in opposition to one another. This means that the first check valve 8 is oriented with its preferably spring-loaded closing element 11 towards the fuel return line 7, the second check valve 9 being oriented with its preferably spring-loaded closing element 12 towards the fuel tank 3. The calibrated pressure limit of the first check valve 8 suitably has a limit value of three bar, for example, and a pressure limit of the second check valve 9, or its opening pressure, is lower.

It is advantageous if the fuel return line 7 coming from the common fuel rail 6 opens out in the high pressure pump 2 or into its suction side, the control element system 10 being arranged upstream of the junction. The two check valves 8, 9 are connected to the tank 3.

It is also possible, however, for the control element system to be formed from a single, active valve. The active valve may be configured to allow fuel to enter the fuel return line from the fuel tank while in a first position, and release fuel pressure from the fuel return line to the fuel tank while in a second position. The active valve is capable of reducing losses from the second check valve, when the internal combustion engine is in its normal operating phase.

In a preferred development the fuel return line 7 is comprised of flexible material, more flexible than the fuel pump line, so that the return line 7 is preferably of entirely pliable or of expandable design. For example, in one embodiment, the fuel return line 7 is comprised entirely of a rubber hose. In another embodiment, the fuel return line is comprised of portions of a flexible material such as a rubber hose. The fuel pump line 4, on the other hand, is preferably comprised of rigid material, more rigid than the flexible material of the fuel return line, so as to prevent fuel accumulation in the fuel pump line 4 and relay the pressure from the high pressure fuel pump 2 to the common fuel rail 6.

The fuel injection system 1 is part of an example vehicle system 100. In the example vehicle system 100 shown in FIG. 1, the driving force of the vehicle system may be generated by the engine 5 with starting power provided by an electric motor of the starter/generator 17 coupled to the engine 5. The driving force to the driving wheels 21 (e.g., front wheels), from the engine 5 is provided via a torque converter system 18, a transmission system 19, and a differential drive system 20. The starter/generator 17 may be powered with electrical power supplied by a battery (not shown).

An engine control apparatus 22 is used for controlling operation of the engine 5. The engine control apparatus 22 of the vehicle system 100 may include an engine controller 23. The engine controller 23 may be coupled to various sensors and may be configured to receive a variety of sensor signals from the various sensors. The sensors may include a vehicle speed sensor, a throttle opening-degree sensor, an engine rotational speed sensor, fuel rail temperature sensor, intake temperature sensor, exhaust temperature sensor, and various pressure sensors. The engine control apparatus 22 may also be coupled to various actuators of the vehicle system and may be further configured to control the operation of the various actuators, including the fuel injectors 14 and the fuel pumps 2 and 16.

The engine control apparatus 22 may be further configured to automatically stop engine operation during selected conditions, such as an idle condition for example, without a driver requesting engine shut down. The engine control apparatus 22 may receive input from various sensors, such as a vehicle speed sensor and vehicle brake sensor, and determine that conditions for an automatic stop have been met. If the internal combustion engine 5 and the motor vehicle are briefly stopped, for example at traffic lights, the engine control apparatus 22 may initiate an automatic stop of the engine 5, and the fuel pumps 2, 16 may be deactivated. As a result, fuel is not pumped from the fuel return line via the high pressure pump but instead the fuel with its inherent pressure is accumulated in the fuel return line 7. This means that the fuel return line 7 functions as a fuel pressure accumulator, when the internal combustion engine 5 stops or is stopped. Owing to its composition, at least in portions thereof, of a flexible material such as a rubber hose, the fuel return line 7 is able to expand under the accumulating pressure and is thus not only able to maintain the pressure, but due to the increase in volume can also store a corresponding quantity of fuel under the relatively high pressure.

Following an automatic stop, the engine control apparatus 22 may receive input from various sensors and determine that conditions for an automatic start have been met. The engine control apparatus 22 may then initiate an auto start by, for example, activating starter/generator 17. Since the fuel return line 7 is coupled to the high pressure fuel pump 2, and opens out into its suction side, the maintained pressure and the quantity of fuel accumulated during engine stoppage are immediately available on restarting of the internal combustion engine 5, with the result that the required starting pressure can be built up very rapidly.

The fuel return line thus virtually forms a fuel accumulator, or a fuel pressure accumulator, which is connected directly to the high pressure fuel pump. When the internal combustion engine is stopped, the pressure prevailing in the fuel return line is accumulated and is immediately available to the fuel pump when the internal combustion engine is restarted. The interaction of the control element system with the fuel return line, which on stopping of the internal combustion engine also has a dual function as a pressure accumulator, thus advantageously serves to supply the fuel pump with the necessary starting pressure and with the necessary quantity of fuel, in order to be able to rapidly build up the required common fuel rail starting pressure. This is achieved due to the high pressure upstream of the fuel pump.

In a particularly advantageous development the fuel return line, or at least portions thereof, is preferably formed entirely from an elastic material, more preferably from a rubber hose. The fuel return line can thereby yield in response to the accumulated pressure therein, that is to say it can expand in volume, and can deliver this increased pressure and the increased quantity of fuel to the fuel pump when the internal combustion engine is restarted.

Figure 2:
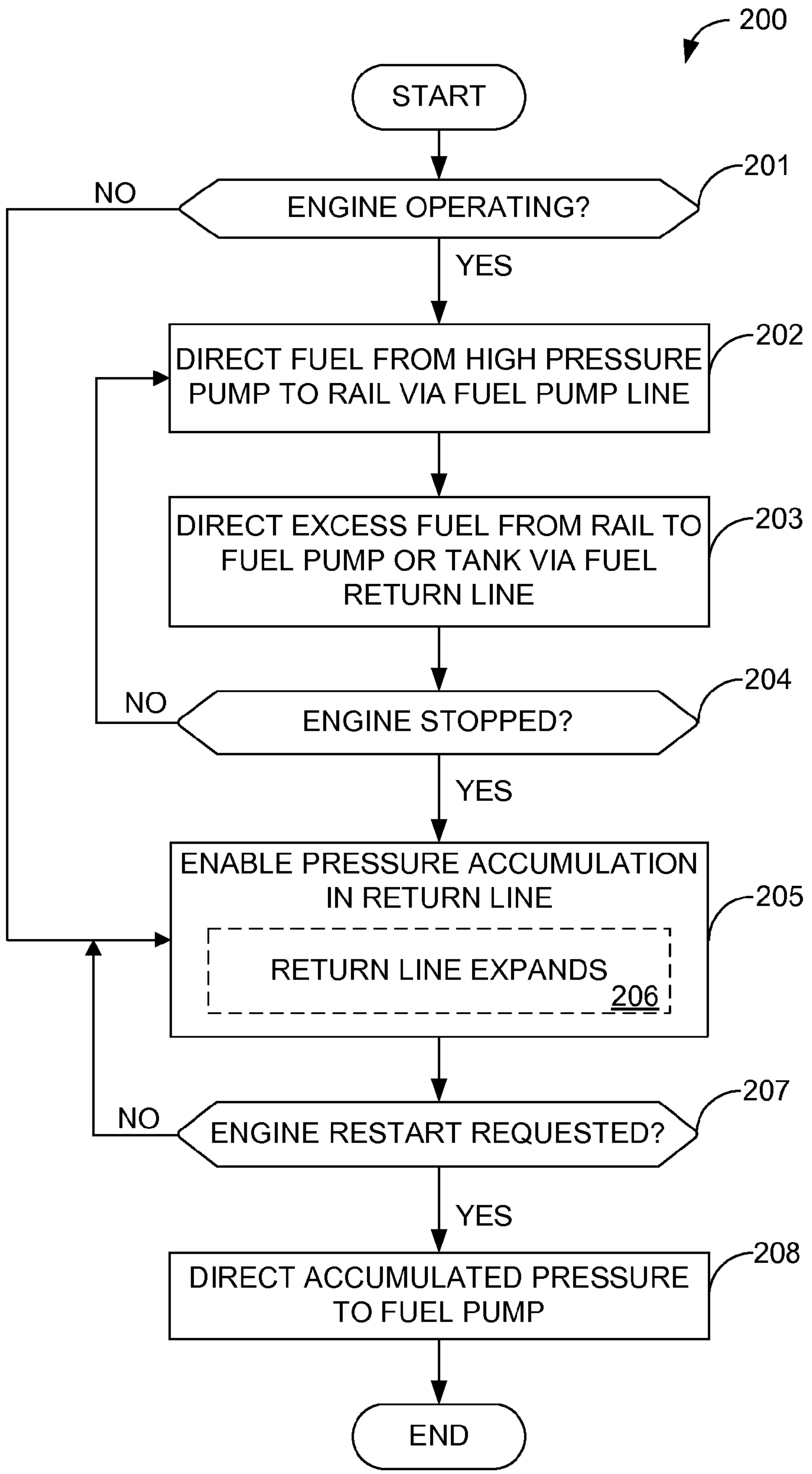
FIGS. 2 and 3 are flow charts illustrating example operations according to the present disclosure.

Turning to FIG. 2, a flow diagram is depicted, illustrating a method 200 for accumulating fuel pressure to enable a rapid engine restart according to an embodiment of the present disclosure. At 201, method 200 comprises determining if the engine is operating. If the engine is not operating, the method proceeds to 205. If yes, fuel is directed from the high pressure fuel pump to the common fuel rail via the fuel pump line at 202 in order to provide fuel for operating the engine. Excess fuel from the fuel rail is directed to the fuel pump or the fuel tank via the fuel return line at 203. The fuel is directed to the fuel pump if the pressure in the fuel return line is below a predetermined threshold, and is released to the fuel tank if the pressure in the fuel return line is above the threshold. Method 200 comprises determining if the engine has stopped at 204. If the engine has not stopped, the method may loop back to 202 to continue to provide fuel to the engine. If it is determined that the engine has stopped, for example the engine control apparatus has initiated an automatic stop due to the motor vehicle stopping at a traffic light, pressure accumulation in the fuel return line is enabled at 205. As a result, the fuel return line may expand at 206 to accumulate the excess fuel, during and throughout engine-off operation. At 207, method 200 comprises determining if an engine restart has been requested, for example by an engine control apparatus receiving signals the driver wishes to drive, such as removing brake pressure. If no, method 200 loops back to 205 and continues to enable pressure accumulation in the fuel return line. If yes, at 208, the accumulated fuel and fuel pressure are directed to the high pressure fuel pump, where the accumulated pressure can be used to enable a rapid engine restart.

Figure 3:
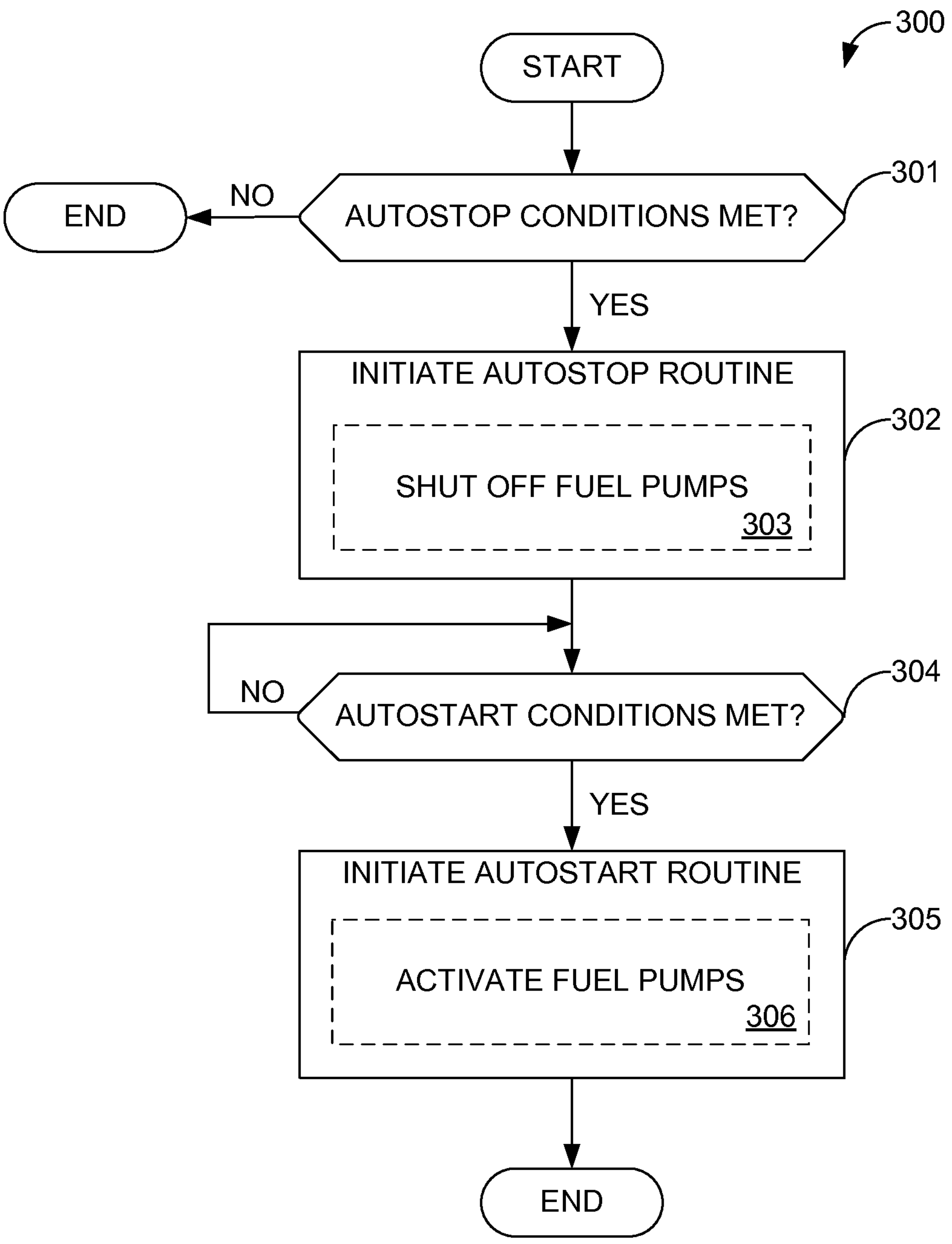

FIG. 3 is a flow diagram depicting a control operation for conducting an automatic stop-start. Routine 300 may include, at 301, confirming that autostop conditions have been met. The autostop conditions may include, for example, that the engine is operating (e.g., carrying out combustion), that the vehicle speed is below a threshold, and that driver requested torque is estimated to be less than a predetermined threshold value. If the autostop conditions are not met at 301, then the routine may end. If autostop conditions are met, routine 300 may initiate an autostop routine at 302, including shutting off fuel pumps at 303, which may lead to fuel pressure accumulation in the fuel return line. At 304, routine 300 determines if autostart conditions have been met. Autostart conditions may include, for example, verifying that the engine is currently in idle stop status, and that the torque requested by the driver is estimated to be above a predetermined threshold. If it is determined that autostart conditions have not been met, routine 300 continues to monitor whether autostart conditions have been met. If the autostart conditions have been met, an autostart routine is initiated at 305, which includes activating the fuel pumps at 306, allowing fuel accumulated during the autostop to be used in the autostart.

The invention claimed is:

1. A fuel injection system for an internal combustion engine, comprising:

a fuel pump;

a common fuel rail;

a fuel pump line coupled to the fuel pump and the common fuel rail and configured to deliver fuel towards the common fuel rail; and a fuel return line coupled to a suction side of the fuel pump and further coupled to the common fuel rail and a fuel tank, the fuel return line comprising a control element system to discharge fuel pressure to the fuel tank when a pressure value in the fuel return line is above a predetermined threshold and to prevent fuel flow into the fuel tank when the pressure value in the fuel return line is not above the predetermined threshold, and further configured to allow fuel from the fuel tank, with help from the fuel pump, to flow into the fuel return line, wherein the control element system comprises two check valves arranged in parallel with each other and restricting flow in opposite directions.

2. The fuel injection system of claim 1, wherein the control element system is arranged upstream of the suction side of the fuel pump.

3. The fuel injection system of claim 1, wherein the fuel return line is comprised of one or more portions of pliable material.

4. The fuel injection system of claim 1, wherein the fuel pump is a first fuel pump, and wherein the fuel injection system further comprises a second fuel pump located in the fuel tank which supplies fuel to the fuel pump via the fuel return line.

5. A fuel injection system comprising:

a fuel pump;

a fuel pump line coupled to the fuel pump and to a common fuel rail; and a fuel return line coupled to the common fuel rail and to a suction side of the fuel pump, and fluidically coupled to a fuel tank via two parallel check valves restricting flow in opposite directions, the fuel return line comprised of flexible material, more flexible than the fuel pump line.

6. The system of claim 5, wherein the fuel pump line is comprised of rigid material more rigid than the flexible material of the fuel return line.

7. The system of claim 5, wherein the flexible material is rubber.

8. The system of claim 5, wherein the two check valves further comprise a first check valve configured to release fuel pressure from the fuel return line to the fuel tank when a pressure value in the return line is greater than a predetermined threshold, and a second check valve configured to allow fuel to enter the fuel return line from the fuel tank.

9. The system of claim 8, wherein the predetermined threshold is 2 and/or 3 bar.

10. The system of claim 5, wherein the fuel return line is coupled to the fuel tank via an active valve, the active valve configured to allow fuel to enter the fuel return line from the fuel tank while in a first position, and release fuel pressure from the fuel return line to the fuel tank while in a second position.

11. The fuel injection system of claim 5, wherein the fuel pump is a first fuel pump, and wherein the fuel injection system further comprises a second fuel pump located in the fuel tank which supplies fuel to the fuel pump via the fuel return line.

12. A method for a rapid restart of an internal combustion engine, comprising:

during engine operation, directing fuel from a first, high-pressure fuel pump to a common fuel rail via a fuel pump line, the common fuel rail feeding fuel injectors;

directing excess fuel from the common fuel rail to a fuel tank and/or the high pressure fuel pump via a fuel return line;

following engine stoppage, enabling fuel pressure accumulation in the fuel return line, the fuel return line comprised of a more flexible material than the common fuel rail and the fuel pump line, the fuel return line expanding to accumulate excess fuel during and throughout engine-off operation;

during a subsequent restart immediately following the engine stoppage, directing accumulated fuel pressure from the fuel return line to the high pressure fuel pump.

13. The method of claim 12, wherein the fuel return line further comprises a control element system fluidically coupled to the fuel tank and configured to release fuel pressure from the fuel return line to the fuel tank when a pressure value in the return line is greater than a predetermined threshold, and further configured to allow fuel to enter the fuel return line from the fuel tank.

14. The method of claim 13, wherein the control element system comprises two check valves.

15. The method of claim 13, where in the control element system comprises one active valve.

16. The method of claim 12, wherein the engine stoppage is performed without a driver requesting an engine shutdown.

17. The method of claim 12, wherein the fuel supplied to the high pressure fuel pump during engine operation is supplied to the high pressure fuel pump via the fuel return line from a second, low-pressure fuel pump located in the fuel tank.

* * * * *